US010735845B2

(12) United States Patent
Lee et al.

(10) Patent No.: US 10,735,845 B2
(45) Date of Patent: Aug. 4, 2020

(54) WIRELESS EARPHONE AND CHARGING CASE

(71) Applicant: CRESYN CO., LTD., Seoul (KR)

(72) Inventors: Jong Bae Lee, Seoul (KR); Se Hong Oh, Seongnam-si (KR); Eun Young Cho, Seoul (KR)

(73) Assignee: CRESYN CO., LTD., Seoul (KR)

( * ) Notice: Subject to any disclaimer, the term of this patent is extended or adjusted under 35 U.S.C. 154(b) by 0 days.

(21) Appl. No.: 16/113,850

(22) Filed: Aug. 27, 2018

(65) Prior Publication Data

US 2019/0075385 A1 Mar. 7, 2019

(30) Foreign Application Priority Data

Sep. 1, 2017 (KR) .......................... 10-2017-0112000
Aug. 3, 2018 (KR) .......................... 10-2018-0090929

(51) Int. Cl.
*H04R 5/033* (2006.01)
*H04R 1/10* (2006.01)
(Continued)

(52) U.S. Cl.
CPC .............. *H04R 1/1025* (2013.01); *H02J 7/00* (2013.01); *H02J 7/0045* (2013.01); *H04R 1/025* (2013.01);
(Continued)

(58) Field of Classification Search
CPC .............. H04R 1/1025; H04R 2420/09; H04R 1/1075; H04R 2205/021; H04R 2420/03;
(Continued)

(56) References Cited

U.S. PATENT DOCUMENTS 6,148,243 A * 11/2000 Ishii ........................ H04S 1/002
700/94
2013/0170664 A1* 7/2013 Schwager ............ H04R 1/1033
381/74
(Continued)

FOREIGN PATENT DOCUMENTS

KR 10-2009-0097619 A 9/2009
KR 10-2016-0103779 A 9/2016
(Continued)

OTHER PUBLICATIONS

Korean Office Action dated Jun. 21, 2018, issued to Korean Application No. 10-2017-0112000.
(Continued)

*Primary Examiner* — George C Monikang
(74) *Attorney, Agent, or Firm* — Stein IP, LLC

(57) ABSTRACT

Disclosed herein is a wireless earphone system. The wireless earphone system includes wireless earphones and a charging case. Each of the wireless earphones includes: a connection unit configured to electrically connect with a charging case; and an internal circuit unit configured to receive a mode switching signal, directing a voice output mode to be switched, applied from the charging case via the connection unit, and to output a sound signal, wirelessly received from an electronic device, to the charging case via the connection unit without outputting the sound signal to a corresponding speaker by itself.

15 Claims, 5 Drawing Sheets

(51) Int. Cl.
  *H02J 7/00*    (2006.01)
  *H04R 1/02*    (2006.01)
(52) U.S. Cl.
  CPC .......... *H04R 1/1016* (2013.01); *H04R 1/1041* (2013.01); *H04R 2420/07* (2013.01)
(58) Field of Classification Search
  CPC ............ H04R 2420/05; H04M 1/0274; H04M 1/0258; H04M 1/6058
  USPC .......................................................... 381/74
  See application file for complete search history.

(56) References Cited

U.S. PATENT DOCUMENTS

| 2015/0215694 | A1* | 7/2015 | Lin ...................... | H04R 1/1033 |
| | | | | 381/370 |
| 2017/0289668 | A1* | 10/2017 | Kim .................... | H04M 1/6066 |
| 2017/0303028 | A1* | 10/2017 | Lalvani ................ | H04R 1/1008 |
| 2018/0014109 | A1* | 1/2018 | Boesen ................ | H04R 1/1041 |

FOREIGN PATENT DOCUMENTS

| KR | 10-2017-0039568 A | 4/2017 |
| WO | WO 2016/161454 A1 | 10/2016 |

OTHER PUBLICATIONS

Korean Office Action dated May 17, 2019, issued to Korean Application No. 10-2018-0090929.
Chinese Office Action dated Oct. 9, 2019, issued to Chinese Application No. 201810968977.0.

* cited by examiner

WIRELESS EARPHONE AND CHARGING CASE

CROSS-REFERENCE TO RELATED APPLICATIONS

This application claims the benefit of Korean Application No. 10-2017-0112000, filed Sep. 1, 2017, and Korean Application No. 10-2018-0090929, filed Aug. 3, 2018, in the Korean Intellectual Property Office. All disclosures of the documents named above are incorporated herein by reference.

BACKGROUND

1. Technical Field

The present invention relates generally to a wireless earphone system which wirelessly receives sound signals from an electronic device, such as a mobile phone, an audio device, or the like, via short-range wireless communication with the electronic device and outputs the sound signals to a user.

2. Description of the Related Art

Generally, wireless earphones are formed in a shape which can be easily carried by a user, and are used in such a way that they are worn in or on the ears of a user. Wireless earphones wirelessly receive sound signals from an electronic device, such as a mobile phone, an audio device, or the like, via Bluetooth-based short-range wireless communication with the electronic device, reproduce the received sound signals, and output the reproduced sound signals to the ears of a user, thereby enabling music to be listened to or voice communication to be performed.

Such wireless earphones each include a Bluetooth module configured to perform short-range wireless communication, and a battery configured to supply driving power to the corresponding Bluetooth module. In this case, a rechargeable battery is employed as the battery of the wireless earphone in order to enable repetitive charging and use.

Accordingly, the wireless earphones need to be recharged when power is discharged from the contained batteries. In order to charge the batteries of the wireless earphones, a dedicated charging device is provided.

A charging case configured to store wireless earphones and charge the batteries of the wireless earphones is widely used as the dedicated charging device which charges the batteries of the earphones. By connecting the wireless earphones to the charging case, the direct current (DC) power of the charging case is supplied to the wireless earphones, and the batteries of the wireless earphones are charged with the power.

A conventional wireless earphone system, such as that described above, is problematic in that a user cannot listen to music or view content, such as a movie, a drama, or the like, during the charging of the wireless earphones because the user cannot wear the wireless earphones in or on his or her ears when the wireless earphones are connected to the charging case and the batteries of the wireless earphones are charged with power, and thus sound signals from an electronic device cannot be reproduced.

SUMMARY

The present invention is proposed to overcome the above-described problems of the conventional technology, and has the following objects:

A first object of the present invention is to output sound signals, received by wireless earphones, to a speaker provided in a charging case when the wireless earphones are connected to the charging case and charged with power, thereby enabling music to be listened to or content, such as a movie, a drama, or the like, to be viewed during the charging of the wireless earphones.

A second object of the present invention is to provide a charging case with its own battery, thereby enabling wireless earphones to be charged with power while being carried.

A third object of the present invention is to maximally suppress the discharging of batteries contained in wireless earphones and a charging case, thereby increasing the usage time of the batteries.

A fourth object of the present invention is to reduce the number of terminals required for the electrical connection between wireless earphones and a charging case and the detection of the connection while maintaining the electrical connectivity and coupling between the wireless earphone and the charging case.

According to an aspect of the present invention, there is provided a wireless earphone including: a connection unit configured to electrically connect with a charging case; and an internal circuit unit configured to receive a mode switching signal, directing a voice output mode to be switched, applied from the charging case via the connection unit, and to output a sound signal, wirelessly received from an electronic device, to the charging case via the connection unit without outputting the sound signal to a corresponding speaker by itself.

The wireless earphone may further include a power supply unit configured to be charged with power applied from the charging case via the connection unit and to supply the power to the internal circuit unit as driving power.

The connection unit may include connection terminals provided for communication with the charging case, the charging of a battery, the transmission of sound signals to the charging case, and the detection of a connection with the charging case; and at least one of the connection terminals may be made of a conductive magnetic material, and may be magnetically connectable to a magnet provided in the charging case.

Among the connection terminals, the connection terminal made of a conductive magnetic material may be a detection connection terminal provided for the detection of a connection with the charging case.

The detection connection terminal may be formed in a ring shape, and remaining connection terminals may be disposed inside the detection connection terminal.

According to a first aspect of the present invention, there is provided a charging case including: first and second connection units configured to electrically connect with wireless earphones; first and second connection detection units allocated to the first and second connection units, respectively, and configured to separately detect whether the wireless earphones are connected; an amplification unit configured to amplify sound signals applied from the wireless earphones connected to at least any one of the first and second connection units; a speaker configured to output the sound signals applied from the amplification unit; and a control unit configured to detect the connection of the wireless earphones via the first and second connection detection units, and to apply a mode switching signal, directing a voice output mode to be switched, to the connected wireless earphones so that the wireless earphones can output sound signals to at least any one of the first and second connection units and the amplification unit can be driven.

According to a second aspect of the present invention, there is provided a charging case including: first and second connection units configured to electrically connect with wireless earphones; first and second connection detection units allocated to the first and second connection units, respectively, and configured to separately detect whether the wireless earphones are connected; an amplification unit provided with first and second amplifiers, and configured to separately amplify sound signals, input to the input terminals of the first and second amplifiers, by means of the first and second amplifiers; first and second speakers configured to separately output the sound signals applied from the amplification unit; a switching unit configured to switch the input path of the sound signals from the wireless earphones, connected to the first and second connection units, to the input terminals of the first and second amplifiers of the amplification unit; and a control unit configured to detect the connection of the wireless earphones via at least any one of the first and second connection detection units, to apply a mode switching signal, directing a voice output mode to be switched, to the connected wireless earphones in response to the manipulation of the mode switch so that the wireless earphones can output sound signals to at least any one of the first and second connection units and the amplification unit can be driven, and to control the switching unit in accordance with the connection of the connected wireless earphones.

According to a third aspect of the present invention, there is provided a charging case including: first and second connection units configured to electrically connect with wireless earphones; first and second connection detection units allocated to the first and second connection units, respectively, and configured to separately detect whether the wireless earphones are connected; a mode switch configured to direct a voice output mode to be switched in response to manual manipulation; an amplification unit configured to amplify sound signals applied from the wireless earphones connected to at least any one of the first and second connection units; a speaker configured to output the sound signals applied from the amplification unit; and a control unit configured to detect the connection of the wireless earphones via at least any one of the first and second connection detection units, and to apply a mode switching signal, directing a voice output mode to be switched, to the connected wireless earphones in response to the manipulation of the mode switch so that the wireless earphone can output the sound signals to at least any one of the first and second connection units and the amplification unit can be driven.

According to a fourth aspect of the present invention, there is provided a charging case including: first and second connection units configured to electrically connect with wireless earphones; first and second connection detection units allocated to the first and second connection units, respectively, and configured to separately detect whether the wireless earphones are connected; a mode switch configured to direct a voice output mode to be switched in response to manual manipulation; an amplification unit provided with first and second amplifiers, and configured to separately amplify sound signals, input to the input terminals of the first and second amplifiers, by means of the first and second amplifiers; first and second speakers configured to separately output the sound signals applied from the amplification unit; a switching unit configured to switch the input path of the sound signals from the wireless earphones, connected to at least any one of the first and second connection units, to the input terminals of the first and second amplifiers of the amplification unit; and a control unit configured to detect the connection of the wireless earphones via at least any one of the first and second connection detection units, to apply a mode switching signal, directing a voice output mode to be switched, to the connected wireless earphones in response to the manipulation of the mode switch so that the wireless earphones can output the sound signals to the connection units and the amplification unit can be driven, and to control the switching unit in accordance with the connected wireless earphones.

Each of the charging case may further include: a third connection unit configured to receive direct current (DC) power from the outside; a power supply unit configured to store the DC power, applied via the third connection unit, therein and output the DC power, or to supply the DC power, applied via the third connection unit, directly to the wireless earphones as charging voltage and supply the DC power to the charging case as driving power; and a charging switching unit configured to open the power supply path of the power supply unit for the wireless earphones connected to at least any one of the first and second connection units under the control of the control unit when the wireless earphones are connected, and to supply charging power to the wireless earphones.

The control unit may turn off a function for communication with the wireless earphone when the connection of the wireless earphone is detected via at least any one of the first and second connection detection units, the charging of the wireless earphone is completed via the power supply unit and then a predetermined condition is satisfied.

The predetermined condition may be a case where a predetermined period has elapsed after the completion of the charging of the wireless earphone without a separate speaker driving command.

At least one of the first and second connection units may include: connection terminals provided for communication with the wireless earphone, the charging of the wireless earphone, and the reception of sound signals from the wireless earphone; and at least one permanent magnet configured to be magnetically connectable to a connection terminal made of a conductive magnetic material present in the wireless earphone; and at least one of the first and second connection detection units may be a detection terminal provided for the detection of the connection of the wireless earphone.

The detection terminal may be disposed at the location at which the detection terminal is electrically connected to a ring-shaped connection terminal made of a conductive magnetic material present in the wireless earphone.

When a ring-shaped closed curve corresponding to a shape of the ring-shaped connection terminal present in the wireless earphone is drawn to pass through the permanent magnet and the detection terminal, the connection terminals may be disposed inside the ring-shaped closed curve.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Embodiments of the present invention will be described in detail below with reference to the accompanying drawings. In the following description, when it is determined that a description of a related well-known technology may make the gist of the present invention unnecessarily obscure, the detailed description will be omitted. Furthermore, the numerals used in the description of the present specification are merely identification symbols which are each intended to distinguish one component from another.

Furthermore, the terms used in the present specification and the attached claims should not be interpreted as being limited to the dictionary meanings thereof, but should be interpreted as having meanings and concepts suitable for the technical spirit of the invention based on the principle that an inventor may appropriately define the concepts of terms in order to describe his or her invention in the best way.

Accordingly, the embodiments described in the present specification and the configurations shown in the accompanying drawings correspond merely to examples of the present invention and do not encompass the overall technical spirit of the present invention, with the result that it should be appreciated that there may be various equivalents which can replace the embodiments and the configurations at the time at which the present application is filed.

Embodiments of the present invention will be more specifically described, but technical parts already given will be omitted or abridged for brevity of description.

<Description of Wireless Earphone System>

Figure 1:
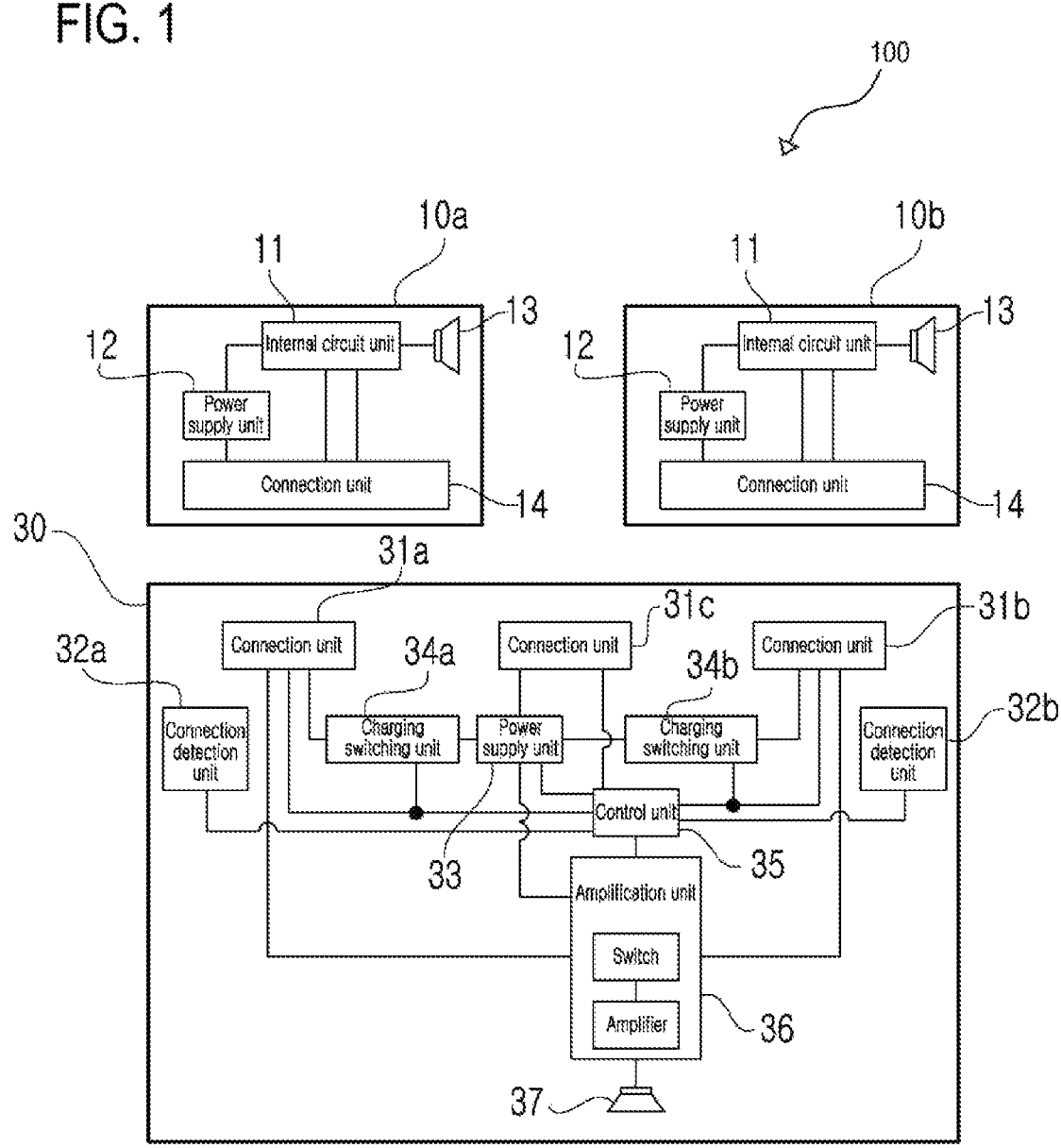
FIG. 1 is a block diagram showing a wireless earphone system according to a first embodiment of the present invention.

As illustrated in FIG. 1, a wireless earphone system 100 according to a first embodiment of the present invention includes wireless earphones 10a and 10b, and a charging case 30.

Each of the wireless earphones 10a and 10b includes an internal circuit unit 11, a power supply unit 12, a speaker 13, and a connection unit 14. The charging case 30 includes connection units 31a, 31b and 31c, connection detection units 32a and 32b, a power supply unit 33, charging switching units 34a and 34b, a control unit 35, an amplification unit 36, and a speaker 37.

The wireless earphones 10a and 10b may be stereo-type wireless earphones used in such a way that one of them is worn in or on the right ear of a user and the other is worn in or on the left ear of the user and configured to provide stereo sounds to the user, or may be a mono-type wireless earphone used in such a way as to be worn only in or on one ear of a user and configured to provide mono sounds to the user.

The internal circuit unit 11 of each of the wireless earphones 10a and 10b includes not only a wireless communication circuit configured to perform short-range wireless communication, such as Bluetooth communication or the like, but also a noise elimination circuit configured to eliminate the noise of a sound signal, an amplification circuit configured to amplify the sound signal, and a control circuit configured to control the overall operation of the wireless earphone. The internal circuit unit 11 performs short-range wireless communication with an electronic device, such as a mobile phone, an audio device, or the like, via a communication method, such as a Bluetooth method or the like, and wirelessly receives a sound signal transmitted from the electronic device. The internal circuit unit 11 outputs the corresponding sound signal to the speaker 13 or connection unit 14 in response to a mode switching signal, directing a voice output mode to be switched, applied from the charging case 30. Although not shown in the drawing, a microphone configured to input a sound signal during voice communication with a mobile phone may be connected to the internal circuit unit 11, and may transmit a sound signal, input via a microphone, to the mobile phone via short-range wireless communication.

The connection unit 14 of each of the wireless earphones 10a and 10b is intended for electrical connection with the charging case 30. When the wireless earphone 10a or 10b is inserted into the charging case 30, the connection unit 14 is connected to one of the connection units 31a, 31b and 31c of the charging case 30 and electrically connected to the charging case 30. When the connection unit 14 is connected to the charging case 30, it transfers power, applied from the charging case 30, to the power supply unit 12, transfers a signal, applied from the charging case 30, to the internal circuit unit 11, and transfers a sound signal, applied from the internal circuit unit 11, to the charging case 30. The connection unit 14 and connection units according to other embodiments to be described later will be described in greater detail in the following section "description of principal characteristic parts."

The power supply unit 12 of each of the wireless earphones 10a and 10b is provided with a battery, is charged with DC power applied from the charging case 30 via the connection unit 14, and supplies the power to the internal circuit unit 11 as driving power.

When the internal circuit unit 11 of each of the wireless earphones 10a and 10b receives a mode switching signal, directing a voice output mode to be switched, applied from the charging case 30 via the connection unit 14, it controls the output of a sound signal so that a sound signal wirelessly received from an electronic device by the internal circuit unit 11 can be output to the charging case 30 via the connection unit 14 without being output to the speaker 13.

Furthermore, the connection detection units 32a and 32b of the charging case 30 detect whether the wireless earphones 10a and 10b are connected to the connection units 31a and 31b allocated thereto, and apply detection signals to the control unit 35. In greater detail, the connection detection unit 32a detects whether the wireless earphone is connected to the connection unit 31a, and the connection detection unit 32b detects whether the wireless earphone is connected to the connection unit 31b.

The connection units 31a and 31b of the charging case 30 are connected to the wireless earphones 10a and 10b. In greater detail, the connection unit 31a is connected to the wireless earphone 10a, and the connection unit 31b is connected to the wireless earphone 10b. When each of the wireless earphones 10a and 10b is inserted into the charging case 30, the connection unit 31a or 31b is connected to the connection unit 14 of the wireless earphone 10a or 10b allocated thereto, and is electrically connected to the wireless earphone 10a or 10b. When the connection unit 31a or 31b is connected to the wireless earphone 10a or 10b allocated thereto, it transfers power, applied from the charging switching unit 34a or 34b, to the connection unit 14 of the wireless earphone 10a or 10b, transfers a mode switching signal, directing a voice output mode to be switched, applied from the control unit 35, to the connection unit 14 of the wireless earphone 10a or 10b, and transfers a sound signal, applied from the connection unit 14 of the wireless earphone 10a or 10b, to the amplification unit 36.

The connection detection units 32a and 32b and the connection units 31a and 31b, and connection detection units and connection units according to other embodiments to be described later will be described in greater detail in the following section "description of principal characteristic parts."

The charging switching units 34a and 34b of the charging case 30 open power supply paths in response to control signals applied from the control unit 35 so that power can be supplied to the wireless earphones 10a and 10b allocated thereto. In greater detail, the charging switching unit 30a opens a power supply path for the wireless earphone 10a connected to the connection unit 31a under the control of the control unit 35, and the charging switching unit 30b opens a power supply path for the wireless earphone 10b connected to the connection unit 31b under the control of the control unit 35.

The power supply unit 33 of the charging case 30 may store DC power, applied via the connection unit 31c, therein and then supply the stored DC power, or may supply DC power, applied via the connection unit 31c, to the wireless earphones 10a and 10b via the charging switching units 34a and 34b as charging power and charge the power supply units 12 of the wireless earphones 10a and 10b with the power by directly supplying the corresponding power. Furthermore, the power supply unit 33 supplies driving power to the control unit 35 and the amplification unit 36.

The connection unit 31c may be used to apply DC power to the power supply unit 33, and may be also used for communication between an external device and the control unit 35. For example, when the control unit 35 updates the firmware of the wireless earphones 10a and 10b by receiving software from an external device connected to the connection unit 31c and then transmitting the corresponding software to the wireless earphones 10a and 10b via the connection units 31a and 31b, the connection unit 31c may be used to perform communication for the transfer of software.

The amplification unit 36 of the charging case 30 amplifies sound signals, applied from the wireless earphones 10a and 10b via the connection units 31a and 31b, under the control of the control unit 35, and outputs the amplified signals to the speaker 37.

When the control unit 35 of the charging case 30 detects the connection of the wireless earphones 10a and 10b via the connection detection units 32a and 32b, it controls the charging switching units 34a and 34b so that power from the power supply unit 33 can be supplied to the power supply units 12 of the wireless earphones 10a and 10b and the power supply units 12 of the wireless earphones 10a and 10b can be charged with the power by applying the corresponding power to the connection units 14 of the wireless earphones 10a and 10b via the connection units 31a and 31b and so that sound signals applied from the wireless earphones 10a and 10b can be output to the speaker 37 by transmitting a mode switching signal, directing a voice output mode to be switched, to the connection units 14 of the wireless earphones 10a and 10b via the connection units 31a and 31b and driving the amplification unit 36.

Furthermore, even in a state in which only one of the two wireless earphones 10a and 10b has been connected, the charging case 30 may charge the corresponding wireless earphone with power, and may also output a sound signal, applied from the corresponding wireless earphone, to the speaker 37. As described above, when the wireless earphone is connected to one of the connection units 31a and 31b of the charging case 30, the control unit 35 of the charging case 30 controls the charging switching units 34a and 34b so that the power supply unit 13 of the wireless earphone can be charged with power by supplying the power only to the corresponding connected wireless earphone and so that a sound signal applied from the corresponding wireless earphone can be amplified by the amplification unit 36 and output to the speaker 37 by applying a mode switching signal to the corresponding connected wireless earphone.

The wireless earphone system 100 according to the first embodiment configured as described above operates, as follows:

When it is necessary to charge the power supply unit 33 of the charging case 30 with power, the power supply unit 33 is charged with DC power by applying the DC power to the power supply unit 33 via the connection unit 31c of the charging case 30. The charging case 30 stores DC power in its own power supply unit 33, and then charges the power supply units 12 of the wireless earphones 10a and 10b using the power of the power supply units 33 and supplies the power as the driving power of the charging case 30 itself, when necessary. Alternatively, the charging case 30 may charge the power supply units 12 of the wireless earphones 10a and 10b with DC power applied via the connection unit 31c and also supply the power as the driving power of the charging case 30 itself by supplying the power directly to the wireless earphones 10a and 10b by means of the power supply units 33.

When a user connects the connection units 14 of the wireless earphones 10a and 10b to the connection units 31a and 31b of the charging case 30 in order to charge the power supply units 12 of the wireless earphones 10a and 10b with power, the connection detection units 32a and 32b of the charging case 30 detect the connection of the wireless earphones 10a and 10b and apply corresponding connection detection signals to the control unit 35 of the charging case 30, thereby notifying the control unit 35 of the connection of the wireless earphones 10a and 10b.

Accordingly, the control unit 35 becomes aware of the connection of the wireless earphones 10a and 10b, and controls the charging switching units 34a and 34b so that power from the power supply unit 33 can be supplied to the wireless earphones 10a and 10b and thus the power supply units 12 of the wireless earphones 10a and 10b can be charged with the power by applying the corresponding power to the connection units 14 of the wireless earphones 10a and 10b via the connection units 31a and 31b and so that a mode switching signal directing a voice output mode to be switched can be transmitted to the wireless earphones 10a and 10b via the connection units 31a and 31b.

Accordingly, the internal circuit units 11 of the wireless earphones 10a and 10b receive the mode switching signal via the connection units 14, and output sound signals, wirelessly received from an electronic device by themselves, to the connection units 31a and 31b of the charging case 30 via the connection units 14 without outputting the sound signals to the speakers 13 of the corresponding wireless earphones. Additionally, the amplification unit 36 of the charging case 30 amplifies the sound signals applied via the connection units 31a and 31b, and outputs the amplified sound signals to the speaker 37. As a result, it is possible to listen to the sound signals, received by the wireless earphones 10a and 10b, via the speaker 37 of the charging case 30 while connecting the wireless earphones 10a and 10b to the charging case 30 and charging the power supply units 12 of the wireless earphones 10a and 10b with power.

Furthermore, even in a state in which only one of the two wireless earphones 10a and 10b has been connected, the charging case 30 may charge the corresponding wireless earphone with power, and may also output a sound signal, applied from the corresponding wireless earphone, to the speaker 37. As described above, when the wireless earphone is connected to one of the connection units 31a and 31b of the charging case 30, the control unit 35 of the charging case 30 controls the charging switching units 34a and 34b so that the power supply unit 12 of the corresponding connected wireless earphone can be charged with power by supplying power only to the wireless earphone and so that a sound signal applied from the corresponding wireless earphone can be amplified by the amplification unit 36 and output to the speaker 37 by applying a mode switching signal to the corresponding connected wireless earphone and driving the amplification unit 36. In this case, under the control of control unit 35, the amplification unit 36 selects a sound signal from sound signals from the connection units 31a and 31b by means of its own switch, and amplifies the selected sound signal by applying it to its own amplifier.

In the above-described wireless earphone system 100 according to the first embodiment of the present invention, when the wireless earphones 10a and 10b are connected to the charging case 30, the control unit 35 of the charging case 30 detects the connection of the corresponding wireless earphones via the connection detection units 32a and 32b, and controls the charging switching units 34a and 34b so that the power supply units 12 of the wireless earphones 10a and 10b can be charged with power and so that a mode switching signal can be transmitted to the internal circuit units 11 of the wireless earphones 10a and 10b, the internal circuit units 11 can output a sound signal, wirelessly received from an electronic device by themselves, to the charging case 30 without outputting the sound signal to the speakers 13 of the corresponding wireless earphones, and the corresponding sound signal can be amplified by the amplification unit 36 and output to the speaker 37. Accordingly, it is possible to listen to music or the sounds of various types of content while charging the wireless earphones 10a and 10b with power. In this case, even when only any one of the wireless earphones 10a and 10b is connected to the charging case 30, the corresponding connected wireless earphone may be charged with power, and also a sound signal applied from the corresponding wireless earphone may be output to the speaker 37 of the charging case 30, in the same manner as described above. Accordingly, it is possible to listen to music or the sounds of various types of content while charging the wireless earphone with power. As a result, the convenience of use of the wireless earphones can be significantly improved.

Figure 2:
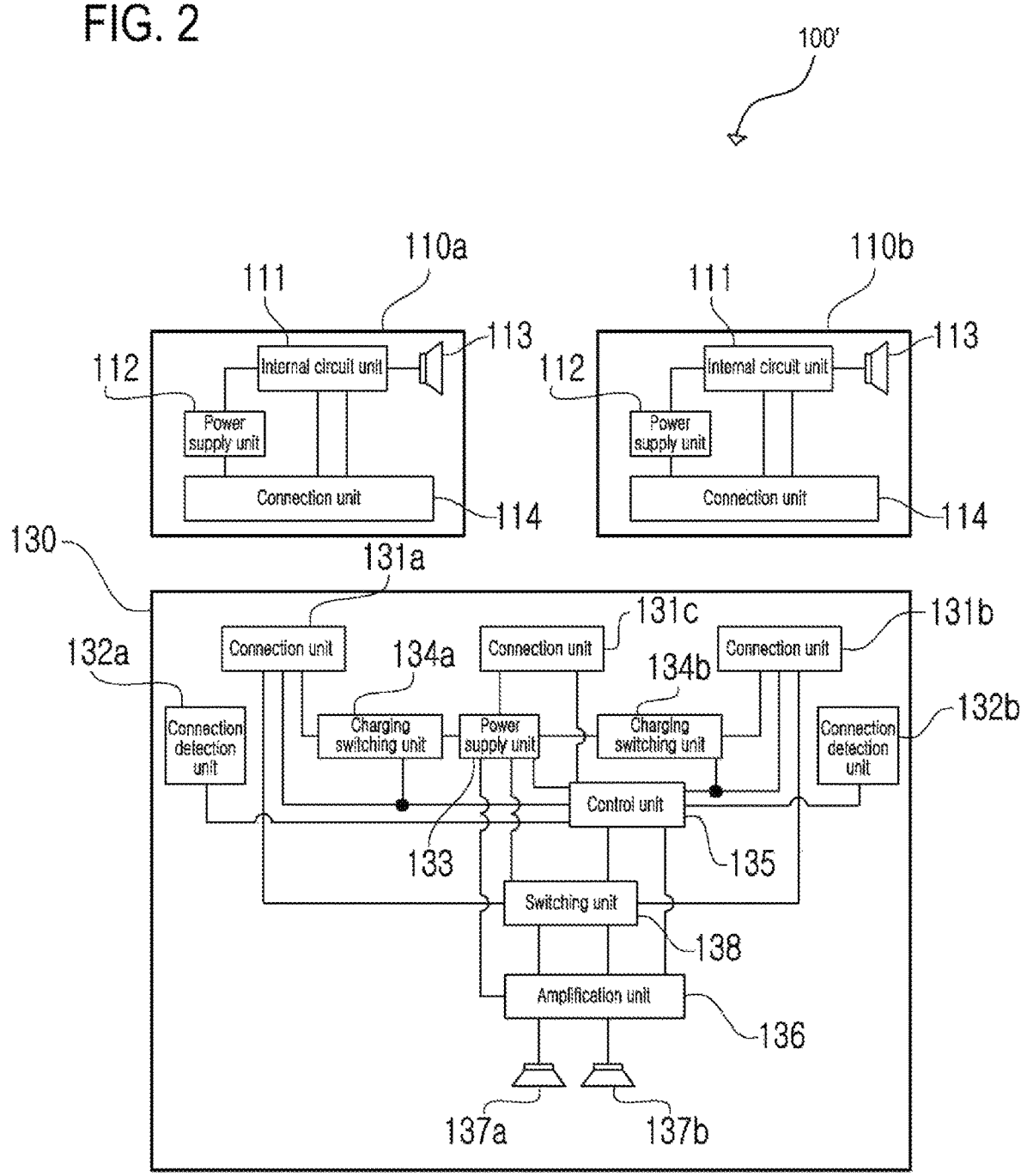
FIG. 2 is a block diagram showing a wireless earphone system according to a second embodiment of the present invention.

Meanwhile, a wireless earphone system 100' according to a second embodiment of the present invention includes wireless earphones 110a and 110b and a charging case 130, as shown in FIG. 2.

Each of the wireless earphones 110a and 110b includes an internal circuit unit 111, a power supply unit 112, a speaker 113, and a connection unit 114. The charging case 130 includes connection units 131a, 131b and 131c, connection detection units 132a and 132b, a power supply unit 133, charging switching units 134a and 134b, a control unit 135, an amplification unit 136, speakers 137a and 137b, and a switching unit 138.

Since components of the wireless earphone system 100' according to the second embodiment of the present invention shown in FIG. 2, which have the same names as components of the above-described wireless earphone system 100 according to the first embodiment, perform the same functions as described above, descriptions of the components having the corresponding same functions will be omitted for ease of description.

The second embodiment is different from the above-described first embodiment in that sound signals applied from the wireless earphones 110a and 110b are separately amplified by the amplification unit 136 and separately output to the two speakers 137a and 137b, thereby enabling the sound signals to be output in a stereo sound form.

For this purpose, the charging case 130 includes the switching unit 138 configured to receive power from the power supply unit 133 and to be driven by the power, and switches the input path of a sound signal applied to the amplification unit 136 via the switching unit 138 under the control of the control unit 135. The amplification unit 136 includes first and second amplifiers in order to output separately amplified sound signals to the two speakers 137a and 137b, separately amplifies sound signals, applied from the switching unit 138, to the input terminals of their own first and second amplifiers, and outputs the amplified sound signals via the speakers 137a and 137b separately allocated to the corresponding first and second amplifiers.

The control unit 135 of the charging case 130 becomes aware of the connection of the wireless earphones 10a and 10b via the connection detection units 132a and 132b, and controls the charging switching units 134a and 134b so that the wireless earphones 110a and 110b can be charged with power by applying power from the power supply unit 133 to the wireless earphones 110a and 110b via the connection units 131a and 131b and so that sound signals from the wireless earphones 110a and 110b can be output via the speakers 137a and 137b by transmitting a mode switching signal, directing a voice output mode to be switched, to the wireless earphones 110a and 110b via the connection units 131a and 131b and driving the amplification unit 136. In this case, the input path of sound signals applied from the wireless earphones 110a and 110b to the input terminals of the first and second amplifiers of the amplification unit 136 is switched by controlling the switching unit 138 in accordance with the connection of the wireless earphones 10a and 10b detected via the connection detection units 132a and 132b.

When the connection of the two wireless earphone 110a, 110b is detected by the connection detection units 132a and 132b, the control unit 135 controls the switching unit 138 so that the sound signal of the wireless earphone 110a can be applied to the input terminal of the first amplifier of the amplification unit 136 and the sound signal of the wireless earphone 110b can be applied to the input terminal of the second amplifier of the amplification unit 136, and the sound signals applied from the wireless earphones 110a and 110b are separately amplified by the first and second amplifiers of the amplification unit 136 and separately output via the speakers 137a and 137b, thereby enabling the sound signals to be output in a stereo sound form. When the connection of the one wireless earphone 110a is detected by the connection detection units 132a and 132b, the control unit 135 controls the switching unit 138 so that the sound signal of the wireless earphone 110a can be applied to the input terminals of the first and second amplifiers of the amplification unit 136 and the sound signal applied from the wireless earphone 110*a* can be amplified by the first and second amplifiers of the amplification unit 136 and output via the speakers 137*a* and 137*b*, thereby enabling the sound signal to be output in a mono sound form. Furthermore, when the connection of the one wireless earphone 110*b* is detected by the connection detection units 132*a* and 132*b*, the control unit 135 controls the switching unit 138 so that the sound signal of the wireless to earphone 110*b* can be applied to the input terminals of the first and second amplifiers of the amplification unit 136 and the sound signal applied from the wireless earphone 110*b* can be amplified by the first and second amplifiers of the amplification unit 136 and output via the speakers 137*a* and 137*b*, thereby enabling the sound signal to be output in a mono sound form.

The wireless earphone system 100' according to the second embodiment configured as described above operates, as follows:

When it is necessary to charge the power supply unit 133 of the charging case 130 with power, the power supply unit 133 is charged with DC power by applying the DC power to the power supply unit 133 via the connection unit 131*c* of the charging case 130. The charging case 130 stores DC power in its own power supply unit 133, and then charges the power supply units 112 of the wireless earphones 110*a* and 110*b* using the power of the power supply unit 133 and supplies the power as the driving power of the charging case 130 itself, when necessary. Alternatively, the charging case 130 may charge the power supply units 112 of the wireless earphones 110*a* and 110*b* with DC power applied via the connection unit 131*c* and also supply the power as the driving power of the charging case 130 itself by supplying the power directly to the wireless earphones 110*a* and 110*b* by means of the power supply units 133.

When a user connects the connection units 114 of the wireless earphones 110*a* and 110*b* to the connection units 131*a* and 131*b* of the charging case 130 in order to charge the power supply units 112 of the wireless earphones 110*a* and 110*b*, the connection detection units 132*a* and 132*b* of the charging case 130 detect the connection of the wireless earphones 110*a* and 110*b* and apply corresponding connection detection signals to the control unit 135 of the charging case 130, thereby notifying the control unit 135 of the connection of the wireless earphones 110*a* and 110*b*.

Accordingly, the control unit 135 becomes aware of the connection of the wireless earphones 110*a* and 110*b*, and controls the charging switching units 134*a* and 134*b* so that power from the power supply unit 133 can be supplied to the wireless earphones 110*a* and 110*b* and the power supply units 112 of the wireless earphones 110*a* and 110*b* can be charged with the power by applying the corresponding power to the connection units 114 of the wireless earphones 110*a* and 110*b* via the connection units 131*a* and 131*b* and so that a mode switching signal directing a voice output mode to be switched can be transmitted to the wireless earphones 110*a* and 110*b* via the connection units 131*a* and 131*b* and the amplification unit 136 can be driven.

Accordingly, the internal circuit units 111 of the wireless earphones 110*a* and 110*b* receive the mode switching signal via the connection units 114, and output sound signals, wirelessly received from an electronic device by themselves, to the charging case 130 via the connection units 114 without outputting the sound signals to the speakers 113 of the corresponding wireless earphones. Additionally, the amplification unit 136 of the charging case 130 amplifies the sound signals applied via the connection units 131*a* and 131*b*, and outputs the amplified sound signals to the speaker 37.

In this case, the control unit 135 may perform switching control on the input path of sound signals applied from the wireless earphones 110*a* and 110*b* to the amplification unit 136 by controlling the switching unit 138 in accordance with the detected connection of the wireless earphones 110*a* and 110*b*. In other words, when the connection of the two wireless earphones 110*a* and 110*b* is detected by the connection detection units 132*a* and 132*b*, the control unit 135 controls the switching unit 138 so that the sound signal of the wireless earphone 110*a* can be applied to the input terminal of the first amplifier amplification unit 136 and the sound signal of the wireless earphone 110*b* can be applied to the input terminal of the second amplifier of the amplification unit 136 and so that the sound signals from the wireless earphones 110*a* and 110*b* can be separately amplified by the first and second amplifiers of the amplification unit 136 and output to the speakers 137*a* and 137*b*, thereby enabling the sound signals to be output in a stereo sound form. When the connection of the one wireless earphone 110*a* is detected by the connection detection units 132*a* and 132*b*, the control unit 135 controls the switching unit 138 so that a sound signal from the wireless earphone 110*a* can be amplified by the first and second amplifiers of the amplification unit 136 and output via the speakers 137*a* and 137*b* by applying the sound signal of the wireless earphone 110*a* to the input terminals of the first and second amplifiers of the amplification unit 136, thereby enabling the sound signal to be output in a mono sound form. When the connection of the one wireless earphone 110*b* is detected by the connection detection units 132*a* and 132*b*, the control unit 135 controls the switching unit 138 so that a sound signal from the wireless earphone 110*b* can be amplified by the first and second amplifiers of the amplification unit 136 and output to the speakers 137*a* and 137*b* by applying the sound signal of the wireless earphone 110*b* to the input terminals of the first and second amplifiers of the amplification unit 136, thereby enabling the sound signal to be output in a mono sound form.

As described above, even in a state in which both or one of the two wireless earphones 110*a* and 110*b* have been connected, the charging case 130 may charge the corresponding wireless earphone(s) with power, and may also output sound signal(s), applied from the corresponding wireless earphone(s), to the speakers 137*a* and 137*b*. When one of the wireless earphones is connected to the charging case 130, the control unit 135 of the charging case 130 controls the charging switching units 134*a* and 134*b* so that the power supply unit 112 of the corresponding connected wireless earphone can be charged with power by supplying power only to the wireless earphone, and controls the switching unit 138 so that a sound signal applied from the corresponding connected wireless earphone can be applied to the input terminals of the first and second amplifiers of the amplification unit 136, amplified, and output to the speakers 137*a* and 137*b*.

In the wireless earphone system 100' according to the second embodiment of the present invention, when the wireless earphones 110*a* and 110*b* are connected to the charging case 130, the control unit 135 of the charging case 130 detects the connection of the corresponding wireless earphones via the connection detection units 132*a* and 132*b*, and controls the charging switching units 134*a* and 134*b* so that the power supply units 112 of the wireless earphones 110*a* and 110*b* can be charged with power and so that a mode switching signal can be transmitted to the internal circuit units 111 of the wireless earphones 110a and 110b and the internal circuit unit 111 can output sound signals, wirelessly received from a electronic device by themselves, to the charging case 130 without outputting the sound signals to their own speakers 113 of the corresponding wireless earphones. Additionally, the control unit 135 of the charging case 130 controls the switching unit 138 so that the input path of the corresponding sound signals can be switched, input to the input terminals of the first and second amplifiers of the amplification unit 136, amplified by the amplification unit 136, and output to the speakers 137a and 137b. Accordingly, it is possible to listen to music or the sounds of various types of content while charging the wireless earphones 110a and 110b with power. In this case, even when any one of the wireless earphones 110a and 110b is connected to the charging case 130, the corresponding connected wireless earphone may be charged with power, and also a sound signal applied from the corresponding wireless earphone may be output to the speakers 137a and 137b of the charging case 130, in the same manner as described above. Accordingly, it is possible to listen to music or the sounds of various types of content while charging the wireless earphone with power. As a result, the convenience of use of the wireless earphones can be significantly improved.

Figure 3:
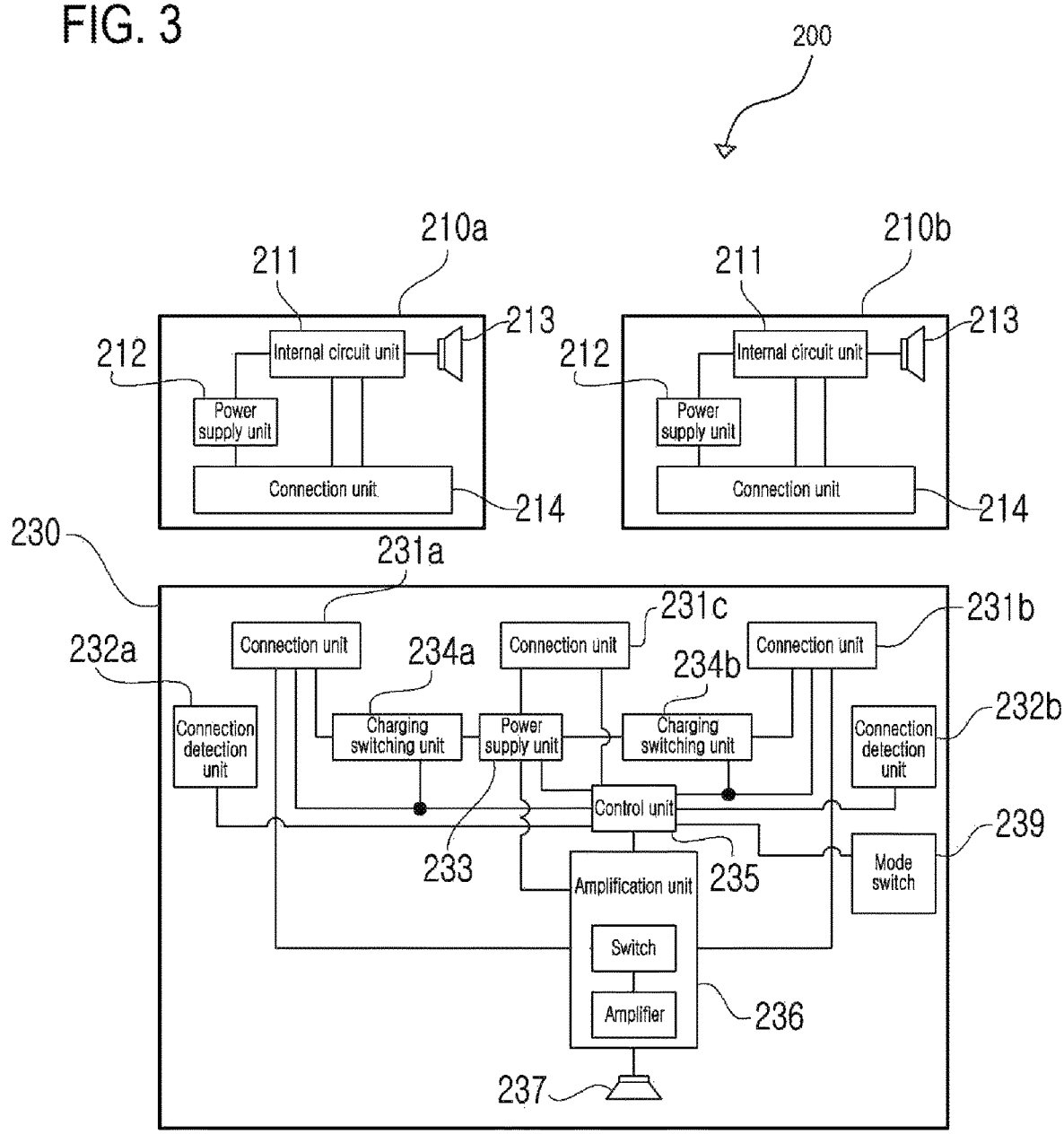
FIG. 3 is a block diagram showing a wireless earphone system according to a third embodiment of the present invention.

Meanwhile, a wireless earphone system 200 according to a third embodiment of the present invention includes wireless earphones 210a and 210b and a charging case 230, as shown in FIG. 3.

Each of the wireless earphones 210a and 210b includes an internal circuit unit 211, a power supply unit 212, a speaker 213, and a connection unit 214. The charging case 230 includes connection units 231a, 231b and 231c, connection detection units 232a and 232b, a power supply unit 233, charging switching units 234a and 234b, a control unit 235, an amplification unit 236, a speaker 237, and a mode switch 239.

Since components of the wireless earphone system 200 according to the third embodiment of the present invention shown in FIG. 3, which have the same names as components of the above-described wireless earphone systems 100, 100' according to the first and second embodiments, perform the same functions as described above, descriptions of the components having the corresponding same functions will be omitted for ease of description.

The wireless earphone system 200 according to the third embodiment includes the mode switch 239 in the charging case 230, and amplifies sound signals from the wireless earphones 210a and 210b by means of the amplification unit 236 and also outputs the amplified sound signals to the speaker 237 by transmitting a mode switching signal, directing a voice output mode to be switched, to the wireless earphones 210a and 210b in response to the manual manipulation of the mode switch 239 during the charging of the wireless earphones 210a and 210b and driving the amplification unit 236. Accordingly, the wireless earphone system 200 outputs sound signals, applied from the wireless earphones 210a and 210b, to the speaker 237 of the charging case 230 only when a user desires during the charging of the wireless earphones 210a and 210b, thereby reducing the consumption of the electrical energy of the charging case 230.

For this purpose, the charging case 230 includes the mode switch 239 which can be manually manipulated by a user. When the connection units 214 of the wireless earphones 210a and 210b are connected to the connection units 231a and 231b of the charging case 230 and the power supply units 212 of the wireless earphones 210a and 210b are charged, the control unit 235 amplifies sound signals, applied from the wireless earphones 210a and 210b, by means of the amplification unit 236 and outputs the amplified sound signals to the speaker 237 by transmitting a mode switching signal to the wireless earphones 210a and 210b in response to the manipulation of the mode switch 239 by the user and driving the amplification unit 236.

The wireless earphone system 200 according to the third embodiment configured as described above operates, as follows:

When it is necessary to charge the power supply unit 233 of the charging case 230, the power supply unit 233 is charged with power by applying DC power to the power supply unit 233 via the connection unit 231c of the charging case 230. The charging case 230 stores the DC power in its own power supply unit 233, and then charges the power supply units 212 of the wireless earphones 210a and 210b using the power of the power supply unit 233 and also supplies the power as the driving power of the charging case 230 itself, when necessary. Alternatively, the charging case 230 may charge the power supply units 212 of the wireless earphones 210a and 210b with DC power applied via the connection unit 231c and also supply the power as the power driving power of the charging case 230 itself by supplying the power directly to the wireless earphones 210a and 210b by means of the power supply unit 233.

When a user connects the connection units 214 of the wireless earphones 210a and 210b to the connection units 231a and 231b of the charging case 230 in order to charge the power supply units 212 of the wireless earphones 210a and 210b, the connection detection units 232a and 232b of the charging case 230 detect the connection of the wireless earphones 210a and 210b and apply corresponding connection detection signals to the control unit 235 of the charging case 230, thereby notifying the control unit 235 of the connection of the wireless earphones 210a and 210b.

Accordingly, the control unit 235 controls the charging switching units 234a and 234b so that power from the power supply unit 233 can be supplied to the wireless earphones 210a and 210b and the power supply units 212 of the wireless earphones 210a and 210b can be charged with the power by applying the corresponding power to the connection units 214 of the wireless earphones 210a and 210b via the connection units 231a and 231b.

As described above, during the charging of the power supply units 212 of the wireless earphones 210a and 210b with power from the power supply unit 233 provided in the charging case 230 through the supply of the power to the wireless earphones 210a and 210b, when a user operates the mode switch 239 of the charging case 230, the control unit 235 detects the operation of the mode switch 239, and transmits a mode switching signal, directing a voice output mode to be switched, to the wireless earphones 210a and 210b via the connection units 231a and 231b. Accordingly, the internal circuit units 211 of the wireless earphones 210a and 210b receive the mode switching signal, and outputs a sound signal, wirelessly received from an electronic device by themselves, to the charging case 230 via the connection unit 214 without outputting the sound signal to the speakers 213 of the corresponding wireless earphones. Furthermore, in addition to transmitting the mode switching signal, the control unit 235 amplifies sound signals, applied from the corresponding wireless earphones, by means of the amplification unit 236 and then outputs the sound signals to the speakers 237 by driving the amplification unit 236 in response to the connection of the wireless earphones. In this case, under the control of the control unit 235, the amplification unit 236 selects a sound signal from the sound signals from the connection units 231a and 231b by means of its own switch, applies the sound signal to its own amplifier, and amplifies the sound signal.

Even in a state in which only one of the two wireless earphones 210a and 210b has been connected, the charging case 230 may charge the corresponding wireless earphone with power, and may also output a sound signal, applied from the corresponding wireless earphone, to the speaker 237.

As described above, when one of the wireless earphones is connected to the charging case 230, the control unit 235 of the charging case 230 controls the charging switching units 234a and 234b so that the power supply unit 212 of the corresponding wireless earphone can be charged with power by supplying power only to the corresponding connected wireless earphone and so that a sound signal applied from the corresponding wireless earphone can be amplified by the amplification unit 236 and output to the speaker 237 by transmitting a mode switching signal to the corresponding connected wireless earphone in response to the manipulation of the mode switch 239.

In the above-described wireless earphone system 200 according to the third embodiment of the present invention, when the wireless earphones 210a and 210b are connected to the charging case 230, the control unit 235 of the charging case 230 detects the connection of the corresponding wireless earphones via the connection detection units 232a and 232b, and controls the charging switching units 234a and 234b so that the power supply units 212 of the wireless earphones 210a and 210b are charged with power and so that the internal circuit units 211 of the wireless earphones 210a and 210b can output a sound signal, wirelessly received from an electronic device by themselves, to the charging case 230 without outputting the sound signal to the speakers 213 of the corresponding wireless earphones by transmitting a mode switching signal to the wireless earphones 210a and 210b in response to the manipulation of the mode switch 239 by a user. Accordingly, it is possible to listen to music or the sounds of various types of content while charging the wireless earphones 210a and 210b with power. As a result, the convenience of use of the wireless earphones can be significantly improved.

Furthermore, the wireless earphone system 200 according to the third embodiment of the present invention transmits a mode switching signal to the wireless earphones 210a and 210b and drives the amplification unit 236 in response to the manipulation of the mode switch 239. Accordingly, sound signals wirelessly received from an electronic device by the wireless earphones 210a and 210b are amplified by the amplification unit 236 of the charging case 230 and then output by transmission the sound signals to the charging case 230. As a result, the amplification unit 236 of the charging case 230 can be driven only when necessary, and thus the advantage of reducing the power consumption of the charging case 230 is achieved.

Figure 4:
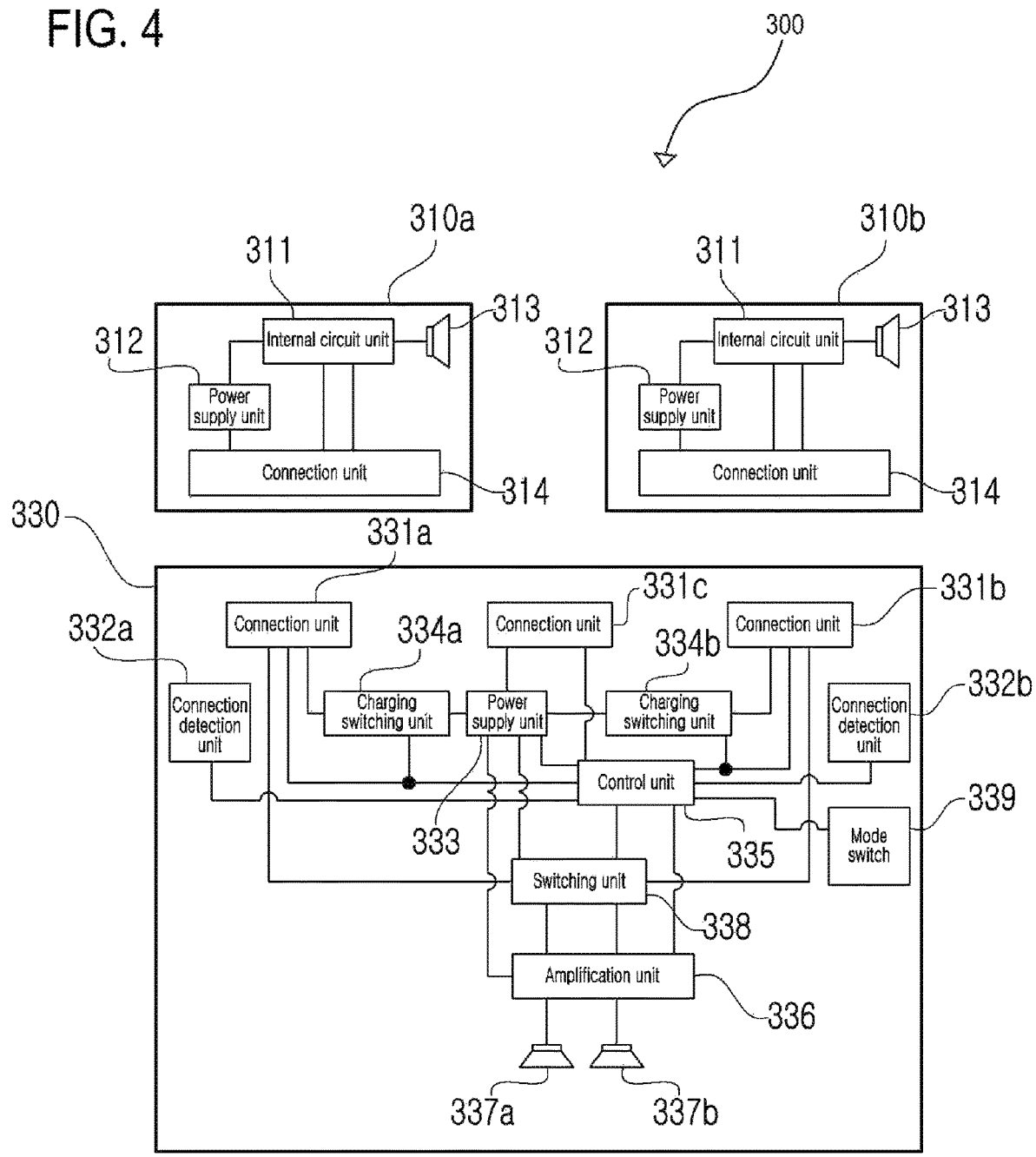
FIG. 4 is a block diagram showing a wireless earphone system according to a fourth embodiment of the present invention.

Meanwhile, a wireless earphone system 300 according to a fourth embodiment of the present invention includes wireless earphones 310a and 310b and a charging case 330, as shown in FIG. 4.

Each of the wireless earphones 310a and 310b includes an internal circuit unit 311, a power supply unit 312, a speaker 313, and a connection unit 314. The charging case 330 includes connection units 331a, 331b and 331c, connection detection units 332a and 332b, a power supply unit 333, charging switching units 334a and 334b, a control unit 335, an amplification unit 336, speakers 337a and 337b, a switching unit 338, and a mode switch 339.

Since components of the wireless earphone system 300 according to the fourth embodiment of the present invention shown in FIG. 4, which have the same names as components of the above-described wireless earphone systems 100, 100', 200 according to the first to third embodiments, perform the same functions as described above, descriptions of the components having the corresponding same functions will be omitted for ease of description.

The wireless earphone system 300 according to the fourth embodiment separately amplifies sound signals, applied from the wireless earphones 310a and 310b, by means of the amplification unit 336 and separately outputs the amplified sound signals to the two speakers 337a and 337b, thereby enabling the sound signals to be output in a stereo form. In greater detail, the wireless earphone system 300 according to the fourth embodiment includes the mode switch 339 in the charging case 330, and amplifies sound signals by means of the amplification unit 336 and also outputs the amplified sound signals to the speakers 227a and 337b in response to the manual manipulation of the mode switch 339. Accordingly, sound signals from the wireless earphones 310a and 310b are output to the speakers 337a and 337b of the charging case 330 in a stereo sound form only when a user desires during the charging of the wireless earphones 310a and 310b, thereby reducing the consumption of the electrical energy of the charging case 330.

For this purpose, the charging case 330 includes the switching unit 338, and switches the input path of sound signals, applied to the amplification unit 336, by means of the switching unit 338 under the control of the control unit 335 so that sound signals from the wireless earphones 210a and 310b are input to the amplification unit 336, amplified by the amplification unit 336, and output via the speakers 337a and 337b. Additionally, the charging case 330 includes the mode switch 339, and transmits a mode switching signal, directing a voice output mode to be switched, to the wireless earphones 310a and 310b and also drives the amplification unit 336 in response to the manual manipulation of the mode switch 339 during the charging of the wireless earphones 310a and 310b. Accordingly, sound signals applied from the wireless earphones 310a and 310b to the charging case 330 are amplified by the amplification unit 336, and are output to the speakers 337a and 337b. As a result, the sound signals from the wireless earphones 310a and 310b are amplified by the amplification unit 336 of the charging case 330 and output to the speakers 337a and 337b in a stereo sound form only when a user desires during the charging of the wireless earphones 310a and 310b, thereby reducing the consumption of the electrical energy of the charging case 330.

The wireless earphone system 300 according to the fourth embodiment configured as described above operates, as follows:

When it is necessary to charge the power supply unit 333 of the charging case 330 with power, the power supply unit 333 is charged with power by applying DC power to the power supply unit 333 via the connection unit 331c of the charging case 330. The charging case 330 stores DC power in its own power supply unit 333, and then charges the power supply units 312 of the wireless earphones 310a and 310b using the power of the power supply unit 333 and also supplies the power to the driving power of the charging case 330 itself, when necessary. Alternatively, the charging case 330 may charge the power supply units 312 of the wireless earphones 310a and 310b with DC power applied via the connection unit 331c and also supply the power as the driving power of the charging case 330 itself by applying the power directly to the wireless earphones 310a and 310b by means of the power supply unit 333.

When a user connects the connection units 314 of the wireless earphones 310a and 310b to the connection units 331a and 331b of the charging case 330 in order to charge the power supply units 312 of the wireless earphones 310a and 310b, the connection detection units 332a and 332b of the charging case 330 detect the connection of the wireless earphones 310a and 310b, and apply a corresponding connection detection signal to the control unit 335 of the charging case 330, thereby notifying the control unit 335 of the connection of the wireless earphones 310a and 310b.

Accordingly, the control unit 335 of the charging case 330 controls the charging switching units 334a and 334b so that power from the power supply unit 333 can be supplied to the wireless earphones 310a and 310b and the power supply units 312 of the wireless earphones 310a and 310b by applying the corresponding power to the connection units 314 of the wireless earphones 310a and 310b via the connection units 331a and 331b.

As described above, during the charging of the power supply units 312 of the wireless earphones 310a and 310b through the supply of power, applied from the power supply unit 333 provided in the charging case 330, to the wireless earphones 310a and 310b, when a user operates the mode switch 339 of the charging case 330, the control unit 335 detects the operation of the mode switch 339, and not only transmits a mode switching signal, directing a voice output mode to be switched, to the wireless earphones 310a and 310b via the connection units 331a and 331b but also drives the amplification unit 336.

Accordingly, the internal circuit units 311 of the wireless earphones 310a and 310b receive the mode switching signal via the connection units 314 and output a sound signal, wirelessly received from an electronic device by themselves, to the charging case 330 via the connection units 314 without outputting the sound signal to the speakers 313 of the corresponding wireless earphones. The amplification unit 336 of the charging case 330 amplifies the sound signals applied via the connection units 331a and 331b, and outputs the amplified sound signals to the speakers 337a and 337b.

In this case, the control unit 335 performs switching control on the input path of sound signals applied from the wireless earphones 310a and 310b to the amplification unit 336 by controlling the switching unit 338 in accordance with the connection of the wireless earphones 310a and 310b. In other words, when the connection of the two wireless earphones 310a and 310b is detected by the connection detection units 332a and 332b, the control unit 335 controls the switching unit 338 so that the sound signal of the wireless earphone 310a can be applied to the input terminal of the first amplifier of the amplification unit 336 and the sound signal of the wireless earphone 310b can be applied to the input terminal of the second amplifier of the amplification unit 336 and thus the sound signals from the wireless earphones 310a and 310b can be separately amplified by the first and second amplifiers of the amplification unit 336 and output to the speakers 337a and 337b in a stereo sound form. When the connection of the one is wireless earphone 310a is detected by the connection detection units 332a and 332b, the control unit 335 controls the switching unit 338 so that the sound signal of the wireless earphone 310a can be applied to the input terminals of the first and second amplifiers of the amplification unit 336 and thus the sound signal from the wireless earphone 310a can be amplified by the first and second amplifiers of the amplification unit 336 and output to the speakers 337a and 337b, thereby enabling the sound signal to be output in a mono sound form. When the connection of the one wireless earphone 310b is detected by the connection detection units 332a and 332b, the control unit 335 controls the switching unit 338 so that the sound signal of the wireless earphone 310b can be applied to the input terminal of the first and second amplifiers of the amplification unit 336 and thus the sound signal from the wireless earphone 310b can be amplified by the first and second amplifiers of the amplification unit 336 and output to the speakers 337a and 337b, thereby enabling the sound signal to be output in a mono sound form.

As described above, even in a state in which both or one of the two wireless earphones 310a and 310b have been connected, the charging case 330 may charge the corresponding wireless earphone(s) with power, and may also output sound signal(s), applied from the corresponding wireless earphone(s), to the speakers 337a and 337b. When one of the wireless earphones is connected to the charging case 330, the control unit 335 of the charging case 330 controls the charging switching units 334a and 334b so that the power supply unit 312 of the corresponding connected wireless earphone can be charged with power by supplying power only to the wireless earphone. Additionally, the control unit 335 of the charging case 330 transmits a mode switching signal to the corresponding connected wireless earphone mode switch 339 in response to the operation of the mode switch 339 so that the corresponding wireless earphone can transmit a sound signal to the charging case 330, and controls the switching unit 338 so that the sound signal applied from the corresponding connected wireless earphone can be applied to the amplification unit 336 and output to the speakers 337a and 337b.

In the above-described wireless earphone system 300 according to the fourth embodiment of the present invention, when the wireless earphones 310a and 310b are connected to the charging case 330, the control unit 335 of the charging case 330 detects the connection of the corresponding wireless earphones via the connection detection units 332a and 332b, and not only controls the charging switching units 334a and 334b so that the power supply units 312 of the wireless earphones 310a and 310b can be charged with power but also transmits a mode switching signal to the wireless earphones 310a and 310b in response to the manipulation of the mode switch 339 so that the internal circuit units 311 of the wireless earphones 310a and 310b allows sound signals, wirelessly received from an electronic device by themselves, to be transmitted to the charging case 330 without outputting the sound signals to the their own speakers 313 of the corresponding wireless earphones. Additionally, the control unit 335 of the charging case 330 switches the input path of a corresponding sound signal by controlling the switching unit 338 so that sound signals from the wireless earphones 310a and 310b can be separately input to the input terminals of the first and second amplifiers of the amplification unit 336, amplified by the amplification unit 336, and output to the speakers 337a and 337b. Accordingly, it is possible to listen to music or the sounds of various types of content in a stereo sound form even while charging the wireless earphones 310a and 310b with power.

In this case, even when any one of the wireless earphones 310a and 310b is connected to the charging case 330, the power supply unit of the corresponding connected wireless earphone can be charged with power and a sound signal from the corresponding wireless earphone can be amplified by the amplification unit 336 and output to the speakers 337a and 337b of the charging case 330 in a mono sound form, in the same manner as described above. Accordingly, it is possible to listen to music or the sounds of various types of content while charging the wireless earphone with power. As a result, the convenience of use of the wireless earphones can be significantly improved.

Furthermore, the wireless earphone system 300 according to the fourth embodiment of the present invention transmits a mode switching signal to the wireless earphones 310a and 310b and drives the amplification unit 336 in response to the manipulation of the mode switch 339 so that a sound signal wirelessly received from an electronic device by the wireless earphones 310a and 310b can be transmitted to the charging case 330, amplified by the amplification unit 336 of the charging case 330, and then output. Accordingly, the amplification unit 336 of the charging case 330 can be driven only when necessary, and thus the advantage of reducing the power consumption of the charging case 330 is achieved.

<Description of Principal Characteristic Parts>

1. Technology for Extension of Usage Time of Batteries

In the above-described wireless earphone system 100, 100', 200, 300, when the wireless earphones 10a and 10b, 110a and 110b, 210a and 210b, or 310a and 310b are mounted on the charging case 30, 130, 230, or 330, whether to use the speaker 13, 113, 213, or 313 needs to be continuously monitored through continuous mutual communication. However, in this case, power is discharged from the batteries contained in the wireless earphones 10a and 10b, 110a and 110b, 210a and 210b, or 310a and 310b and the charging case 30, 130, 230, or 330 due to the consumption of standby power, and thus the usage time of the batteries is reduced. Accordingly, it is necessary to secure the usage time of the batteries. For this purpose, the control unit 35, 135, 235, or 335 performs a special operation.

First, when the wireless earphones 10a and 10b, 110a and 110b, 210a and 210b, or 310a and 310b are mounted on the charging case 30, 130, 230, or 330 and the connection of the wireless earphones 10a and 10b, 110a and 110b, 210a and 210b, or 310a and 310b is detected via at least any one of the first connection detection unit 32a, 132a, 232a, or 332a and the second connection detection unit 32b, 132b, 232b, or 332b, the control unit 35, 135, 235, or 335 executes the operation of charging the wireless earphones 10a and 10b, 110a and 110b, 210a and 210b, or 310a and 310b via the power supply unit 33, 133, 233, or 333. Furthermore, when the charging of the wireless earphones 10a and 10b, 110a and 110b, 210a and 210b, or 310a and 310b is completed, the control unit 35, 135, 235, or 335 determines whether a predetermined condition is satisfied, and turns off the communication function of the charging case 30, 130, 230, or 330 when the predetermined condition is satisfied. In this case, although the predetermined condition may include various examples, the predetermined condition refers to a case where a predetermined period, e.g., one minute, two minutes, or the like, has elapsed after the completion of the charging of the wireless earphones 10a and 10b, 110a and 110b, 210a and 210b, or 310a and 310b without a driving command for the separate speaker 13, 113, 213, or 313 in the present embodiment. In this case, the control unit 35, 135, 235, or 335 determines that a user has no intention to drive the speaker 13, 113, 213, or 313, and turns off the communication function of the charging case 30, 130, 230, or 330, thereby preventing standby power from being consumed.

In this case, when the communication function of the charging case 30, 130, 230, or 330 is turned off by the control unit 35, 135, 235, or 335, it is preferred that information about this situation is transferred to the wireless earphones 10a and 10b, 110a and 110b, 210a and 210b, or 310a and 310b and the communication functions of the wireless earphones 10a and 10b, 110a and 110b, 210a and 210b, or 310a and 310b are turned off.

It will be apparent that an implementation may be configured such that the above special operation is assigned to the control units (not shown) of the wireless earphones 10a and 10b, 110a and 110b, 210a and 210b, or 310a and 310b, and, when the communication functions of the wireless earphones 10a and 10b, 110a and 110b, 210a and 210b, or 310a and 310b are turned off, information about this situation is transferred to the charging case 30, 130, 230, or 330, and then the communication function of the charging case 30, 130, 230, or 330 is also turned off.

2. Technology for Connection Unit and Connection Detection Unit

The wireless earphone system 100, 100', 200, 300 according to the present invention has a special structure so that the appropriate connection between the wireless earphones 10a and 10b, 110a and 110b, 210a and 210b, or 310a, 310b and the charging case 30, 130, 230, or 330 can be secured and manufacturing cost can be reduced. This will be described below.

Figure 5:
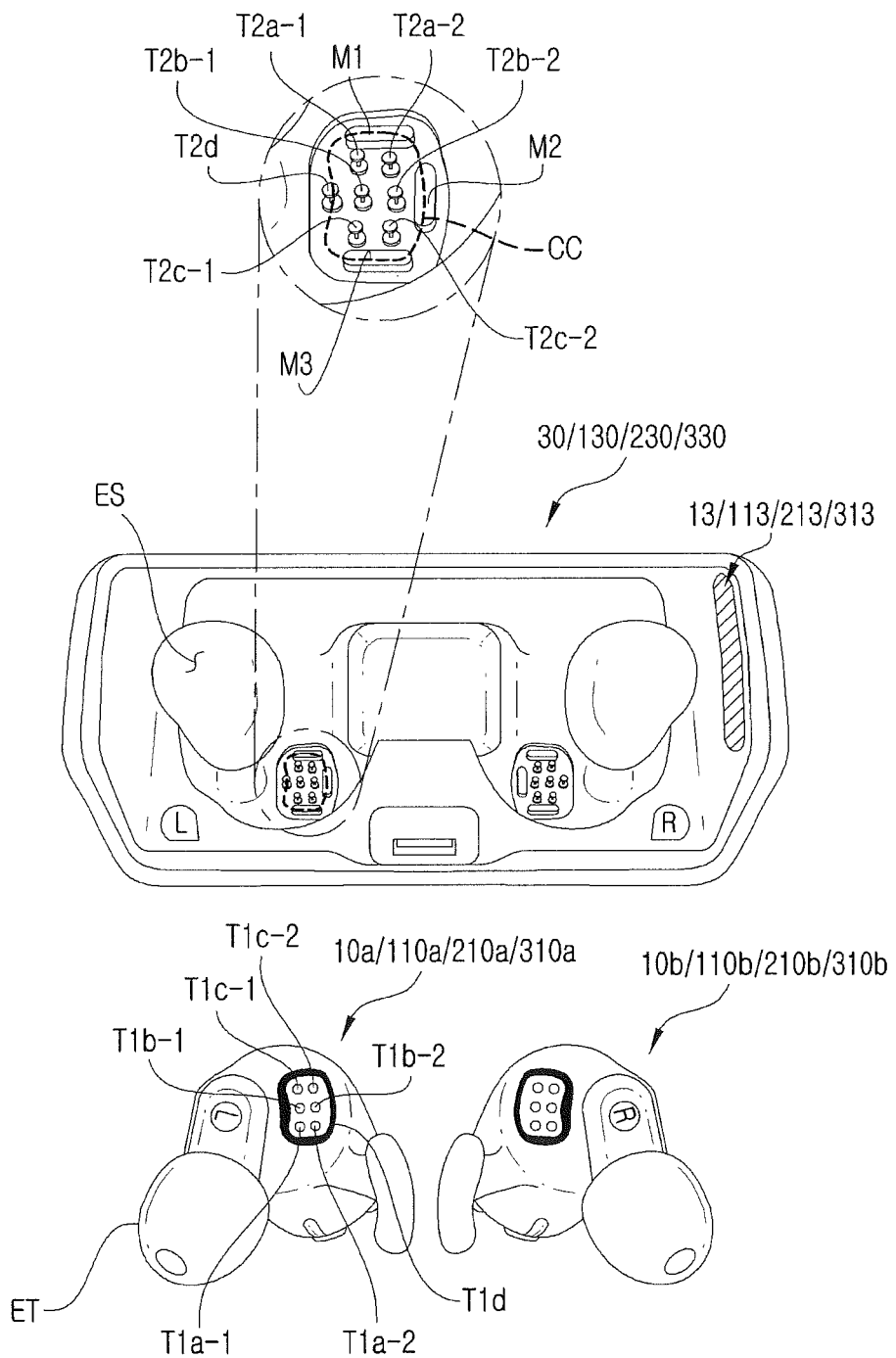
FIG. 5 is a schematic reference drawing showing technology for the connection between wireless earphones and a charging case in the wireless earphone system.

FIG. 5 is a schematic reference drawing showing technology for the connection between the wireless earphones 10a and 10b, 110a and 110b, 210a and 210b, or 310a and 310b and the corresponding charging case 30, 130, 230, or 330.

First, the connection unit 14, 114, 214, or 314 of each of the wireless earphones 10a and 10b, 110a and 110b, 210a and 210b, or 310a and 310b includes two communication connection terminals T1a-1 and T1a-2, two charging connection terminals T1b-1 and T1b-2, two signal transmission connection terminals T1c-1 and T1c-2, and one detection connection terminal T1d.

The communication connection terminals T1a-1 and T1a-2 are provided for the purpose of communication with the charging case 30, 130, 230, or 330.

The charging connection terminals T1b-1 and T1b-2 are provided for the purpose of the changing of the wireless earphone 10a, 10b, 110a, 110b, 210a, 210b, 310a, or 310b.

The signal transmission connection terminals T1c-1 and T1c-2 are provided for the purpose of transmission of sound signals from the wireless earphone 10a, 10b, 110a, 110b, 210a, 210b, 310a, or 310b to the charging case 30, 130, 230, or 330.

The detection connection terminal T1d is provided for the purpose of the detection of the electrical connection between the wireless earphone 10a, 10b, 110a, 110b, 210a, 210b, 310a, or 310b and the charging case 30, 130, 230, or 330. The detection connection terminal T1d is formed in an approximately rectangular ring shape. The detection connection terminal T1d is made of a magnetic material, and thus enables magnetic coupling with a magnet. Furthermore, the detection connection terminal T1d has conductivity, and thus enables electrical connection.

In the present embodiment, the remaining communication connection terminals T1a-1 and T1a-2, charging connection terminals T1b-1 and T1b-2, and signal transmission connection terminals T1c-1 and T1c-2 are disposed inside the ring-shaped detection connection terminal T1d. Accordingly, consideration is given so that, when the detection connection terminal T1d is coupled to the charging case 30, 130, 230, or 330 by magnetic force, the remaining communication connection terminals T1a-1 and T1a-2, charging connection terminals T1b-1 and T1b-2, and signal transmission connection terminals T1c-1 and T1c-2 can be appropriately connected to the charging case 30, 130, 230, or 330 in an electrical manner.

It will be apparent that, although the detection connection terminal T1d is made of a conductive magnetic material in the present embodiment, an implementation may be configured in an embodiment such that any one of the remaining communication connection terminals T1a-1 and T1a-2, charging connection terminals T1b-1 and T1b-2, and signal transmission connection terminals T1c-1 and T1c-2 is made of a ring-shaped conductive magnetic material and the other connection terminals are disposed in the former terminal.

Next, the charging case 30, 130, 230, or 330 will be discussed.

First, each of the connection units 31a and 31b, 131a and 131b, 231a and 231b, or 331a and 331b of the charging case 30, 130, 230, or 330 includes two communication connection terminals T2a-1 and T2a-2, two charging connection terminals T2b-1 and T2b-2, two signal transmission connection terminals T2c-1 and T2c-2, and permanent magnets M1 to M3. In this case, when the wireless earphone 10a, 10b, 110a, 110b, 210a, 210b, 310a, or 310b is mounted on the charging case 30, 130, 230, or 330, the two communication connection terminals T2a-1 and T2a-2, two charging connection terminals T2b-1 and T2b-2, and two signal transmission connection terminals T2c-1 and T2c-2 of the charging case 30, 130, 230, or 330 are electrically connected to the two communication connection terminals T1a-1 and T1a-2, two charging connection terminals T1b-1 and T1b-2, and two signal transmission connection terminals T1c-1 and T1c-2 of the wireless earphone 10a, 10b, 110a, 110b, 210a, 210b, 310a, 310b correspondingly.

In the same manner, the two communication connections terminal T2a-1 and T2a-2 is provided in the purpose of communication with the wireless earphone 10a, 10b, 110a, 110b, 210a, 210b, 310a, or 310b. In this case, the communication between the wireless earphone 10a, 10b, 110a, 110b, 210a, 210b, 310a, or 310b and the charging case 30, 130, 230, or 330 refers to the transfer of an operation command to drive a Bluetooth function present in the wireless earphone 10a, 10b, 110a, 110b, 210a, 210b, 310a, or 310b, an operation command to drive the speaker 13, 113, 213, or 313, or the like.

The two charging connection terminals T2b-1 and T2b-2 are provided for the purpose of the charging of the wireless earphone 10a, 10b, 110a, 110b, 210a, 210b, 310a, or 310b.

The two signal transmission connection terminals T2c-1 and T2c-2 are provided for the purpose of the reception of sound signals transmitted from the wireless earphone 10a, 10b, 110a, 110b, 210a, 210b, 310a, or 310b.

The permanent magnets M1 to M3 are provided for the purpose of magnetic coupling with the detection connection terminal T1d of the wireless earphone 10a, 10b, 110a, 110b, 210a, 210b, 310a, or 310b. Accordingly, the permanent magnets M1 to M3 need to be disposed at locations corresponding to that of the ring-shaped detection connection terminal T1d.

Meanwhile, each of the connection detection units 32a and 32b, 132a and 132b, 232a and 232b, or 332a and 332b of the charging case 30, 130, 230, 330 according to the present embodiment has a detection terminal T2d corresponding to the detection connection terminal T1d of the wireless earphone 10a, 10b, 110a, 110b, 210a, 210b, 310a, or 310b. When the wireless earphone 10a, 10b, 110a, 110b, 210a, 210b, 310a, or 310b is mounted on the charging case 30, 130, 230, or 330, the detection terminal T2d is electrically connected to the detection connection terminal T1d.

Accordingly, the detection terminal T2d also needs to be disposed at a location corresponding to that of the ring-shaped detection connection terminal. As a result, when a ring-shaped closed curve CC corresponding to the shape of the ring-shaped connection terminal present in the wireless earphone is drawn to pass through the permanent magnets and the detection terminal, the above-described two communication connection terminals T2a-1 and T2a-2, two charging connection terminals T2b-1 and T2b-2, and two signal transmission connection terminals T2c-1 and T2c-2 are disposed inside the corresponding closed curve CC.

According to the characteristic technology regarding the connection units 14, 114, 214, or 314 of the wireless earphones 10a and 10b, 110a and 110b, 210a and 210b, or 310a and 310b and the connection units 31a and 31b, 131a and 131b, 231a and 231b, or 331a and 331b of the charging case 30, 130, 230, or 330, when the wireless earphones 10a and 10b, 110a and 110b, 210a and 210b, or 310a and 310b are mounted on the charging case 30, 130, 230, or 330 in such a manner that the ear tips ET of the wireless earphones 10a and 10b, 110a and 110b, 210a and 210b, or 310a and 310b are inserted into the accommodation spaces ES of the charging case 30, 130, 230, or 330, the wireless earphones 10a and 10b, 110a and 110b, 210a and 210b, or 310a and 310b are stably mounted on the charging case 30, 130, 230, or 330. Accordingly, it may be possible to reduce the number of separate terminals configured to detect mounting while appropriately ensuring mutual electric connection. As a result, design and manufacturing costs can be reduced, and the size of the wireless earphones 10a and 10b, 110a and 110b, 210a and 210b, or 310a and 310b can be minimized.

According to the present invention, the following advantages are achieved:

First, sound signals received by the wireless earphones can be output to the speaker provided in the charging case when the wireless earphones are connected to the charging case and charged with power, and thus music can be listened to or content, such as a movie, a drama, or the like, can be viewed during the charging of the wireless earphones, thereby significantly improving the convenience of use of the wireless earphones.

Second, the charging case is provided with its own battery, and thus the wireless earphones can be charged with power while being carried, thereby sufficiently securing the usage time of the wireless earphones.

Third, when a predetermined condition is satisfied, the communication between the wireless earphones and the charging case is turned off, thereby maximally securing the usage time of the wireless earphones and the charging case.

Fourth, the number of terminals required for the electrical connection between the wireless earphones and the charging case and the detection of the connection can be reduced, and the design of the wireless earphones can be facilitated and the manufacturing cost of the wireless earphones can be reduced.

Although the present invention has been specifically described in conjunction with the embodiments, the above-described embodiments are merely examples of the present invention. Accordingly, the present invention should not be construed as being limited only to the embodiments, and the scope of the present invention should be construed as encompassing not only the attached claims but also equivalents to the claims.

What is claimed is:

1. A wireless earphone system comprising a wireless earphone and a charging case, the wireless earphone comprising:
a connection unit configured to electrically connect with a charging case; and
an internal circuit unit configured to receive a mode switching signal, directing a voice output mode to be switched, applied from the charging case via the connection unit, and to output a sound signal, wirelessly received from an electronic device, to the charging case via the connection unit without outputting the sound signal to a corresponding speaker by itself,
wherein the connection unit comprises connection terminals provided for communication with the charging case, charging of a battery, transmission of sound signals to the charging case, and detection of a connection with the charging case; and
wherein at least one of the connection terminals is made of a conductive magnetic material, and is magnetically connectable to a magnet provided in the charging case,
the charging case comprising:
first and second connection units configured to electrically connect with wireless earphones;
first and second connection detection units allocated to the first and second connection units, respectively, and configured to separately detect whether the wireless earphones are connected;
an amplification unit configured to amplify sound signals applied from the wireless earphones connected to at least any one of the first and second connection units;
a speaker configured to output the sound signals applied from the amplification unit; and
a control unit configured to detect connection of the wireless earphones via the first and second connection detection units, and to apply a mode switching signal, directing a voice output mode to be switched, to the connected wireless earphones so that the wireless earphones can output sound signals to at least any one of the first and second connection units and the amplification unit can be driven,
wherein at least one of the first and second connection units comprises:
connection terminals provided for communication with the wireless earphone, charging of the wireless earphone, and reception of sound signals from the wireless earphone; and
at least one permanent magnet configured to be magnetically connectable to a connection terminal made of a conductive magnetic material present in the wireless earphone; and
wherein at least one of the first and second connection detection units is a detection terminal provided for detection of a connection of the wireless earphone,
wherein the control unit turns off a function for communication with the wireless earphone when a connection of the wireless earphone is detected via at least any one of the first and second connection detection units, charging of the wireless earphone is completed via the power supply unit and then a predetermined condition is satisfied,
wherein the predetermined condition is a case where a predetermined period has elapsed after the completion of the charging of the wireless earphone without a separate speaker driving command.

2. The wireless earphone system of claim 1, wherein the wireless earphone further comprises a power supply unit configured to be charged with power applied from the charging case via the connection unit and to supply the power to the internal circuit unit as driving power.

3. The wireless earphone system of claim 1, wherein, among the connection terminals, the connection terminal made of a conductive magnetic material is a detection connection terminal provided for detection of a connection with the charging case.

4. The wireless earphone system of claim 3, wherein the detection connection terminal is formed in a ring shape, and remaining connection terminals are disposed inside the detection connection terminal.

5. A charging case comprising:
first and second connection units configured to electrically connect with wireless earphones;
first and second connection detection units allocated to the first and second connection units, respectively, and configured to separately detect whether the wireless earphones are connected;
an amplification unit configured to amplify sound signals applied from the wireless earphones connected to at least any one of the first and second connection units;
a speaker configured to output the sound signals applied from the amplification unit; and
a control unit configured to detect connection of the wireless earphones via the first and second connection detection units, and to apply a mode switching signal, directing a voice output mode to be switched, to the connected wireless earphones so that the wireless earphones can output sound signals to at least any one of the first and second connection units and the amplification unit can be driven,
wherein at least one of the first and second connection units comprises:
connection terminals provided for communication with the wireless earphone, charging of the wireless earphone, and reception of sound signals from the wireless earphone; and
at least one permanent magnet configured to be magnetically connectable to a connection terminal made of a conductive magnetic material present in the wireless earphone; and
wherein at least one of the first and second connection detection units is a detection terminal provided for detection of a connection of the wireless earphone,
wherein the control unit turns off a function for communication with the wireless earphone when a connection of the wireless earphone is detected via at least any one of the first and second connection detection units, charging of the wireless earphone is completed via the power supply unit and then a predetermined condition is satisfied,
wherein the predetermined condition is a case where a predetermined period has elapsed after the completion of the charging of the wireless earphone without a separate speaker driving command.

6. The charging case of claim 5, further comprising:
a third connection unit configured to receive direct current (DC) power from an outside;
a power supply unit configured to store the DC power, applied via the third connection unit, therein and output the DC power, or to supply the DC power, applied via the third connection unit, directly to the wireless earphones as charging voltage and supply the DC power to the charging case as driving power; and
a charging switching unit configured to open a power supply path of the power supply unit for the wireless earphones connected to at least any one of the first and second connection units under a control of the control unit when the wireless earphones are connected, and to supply charging power to the wireless earphones.

7. The charging case of claim 5, wherein the detection terminal is disposed at a location at which the detection terminal is electrically connected to a ring-shaped connection terminal made of a conductive magnetic material present in the wireless earphone.

8. The charging case of claim 7, wherein, when a ring-shaped closed curve corresponding to a shape of the ring-shaped connection terminal present in the wireless earphone is drawn to pass through the permanent magnet and the detection terminal, the connection terminals are disposed inside the ring-shaped closed curve.

9. A charging case comprising:
first and second connection units configured to electrically connect with wireless earphones;
first and second connection detection units allocated to the first and second connection units, respectively, and configured to separately detect whether the wireless earphones are connected;
an amplification unit provided with first and second amplifiers, and configured to separately amplify sound signals, input to input terminals of the first and second amplifiers, by means of the first and second amplifiers;
first and second speakers configured to separately output the sound signals applied from the amplification unit;
a switching unit configured to switch an input path of the sound signals from the wireless earphones, connected to the first and second connection units, to the input terminals of the first and second amplifiers of the amplification unit; and
a control unit configured to detect connection of the wireless earphones via at least any one of the first and second connection detection units, to apply a mode switching signal, directing a voice output mode to be switched, to the connected wireless earphones so that the wireless earphones can output sound signals to at least any one of the first and second connection units and the amplification unit can be driven, and to control the switching unit in accordance with the connected wireless earphones,
wherein at least one of the first and second connection units comprises:
connection terminals provided for communication with the wireless earphone, charging of the wireless earphone, and reception of sound signals from the wireless earphone; and
at least one permanent magnet configured to be magnetically connectable to a connection terminal made of a conductive magnetic material present in the wireless earphone; and
wherein at least one of the first and second connection detection units is a detection terminal provided for detection of a connection of the wireless earphone,
wherein the control unit turns off a function for communication with the wireless earphone when a connection of the wireless earphone is detected via at least any one of the first and second connection detection units, charging of the wireless earphone is completed via the power supply unit and then a predetermined condition is satisfied,
wherein the predetermined condition is a case where a predetermined period has elapsed after the completion of the charging of the wireless earphone without a separate speaker driving command.

10. The charging case of claim 9, further comprising:
a third connection unit configured to receive direct current (DC) power from an outside;
a power supply unit configured to store the DC power, applied via the third connection unit, therein and output the DC power, or to supply the DC power, applied via the third connection unit, directly to the wireless earphones as charging voltage and supply the DC power to the charging case as driving power; and
a charging switching unit configured to open a power supply path of the power supply unit for the wireless earphones connected to at least any one of the first and second connection units under a control of the control unit when the wireless earphones are connected, and to supply charging power to the wireless earphones.

11. The charging case of claim 9, wherein the detection terminal is disposed at a location at which the detection terminal is electrically connected to a ring-shaped connection terminal made of a conductive magnetic material present in the wireless earphone.

12. A charging case comprising:
first and second connection units configured to electrically connect with wireless earphones;
first and second connection detection units allocated to the first and second connection units, respectively, and configured to separately detect whether the wireless earphones are connected;
a mode switch configured to direct a voice output mode to be switched in response to manual manipulation;
an amplification unit configured to amplify sound signals applied from the wireless earphones connected to at least any one of the first and second connection units;
a speaker configured to output the sound signals applied from the amplification unit; and
a control unit configured to detect connection of the wireless earphones via at least any one of the first and second connection detection units, and to apply a mode switching signal, directing a voice output mode to be switched, to the connected wireless earphones in response to manipulation of the mode switch so that the wireless earphone can output the sound signals to at least any one of the first and second connection units and the amplification unit can be driven,
wherein at least one of the first and second connection units comprises:
connection terminals provided for communication with the wireless earphone, charging of the wireless earphone, and reception of sound signals from the wireless earphone; and
at least one permanent magnet configured to be magnetically connectable to a connection terminal made of a conductive magnetic material present in the wireless earphone; and
wherein at least one of the first and second connection detection units is a detection terminal provided for detection of a connection of the wireless earphone,
wherein the control unit turns off a function for communication with the wireless earphone when a connection of the wireless earphone is detected via at least any one of the first and second connection detection units, charging of the wireless earphone is completed via the power supply unit and then a predetermined condition is satisfied,
wherein the predetermined condition is a case where a predetermined period has elapsed after the completion of the charging of the wireless earphone without a separate speaker driving command.

13. The charging case of claim 12, further comprising:
a third connection unit configured to receive direct current (DC) power from an outside;
a power supply unit configured to store the DC power, applied via the third connection unit, therein and output the DC power, or to supply the DC power, applied via the third connection unit, directly to the wireless earphones as charging voltage and supply the DC power to the charging case as driving power; and
a charging switching unit configured to open a power supply path of the power supply unit for the wireless earphones connected to at least any one of the first and second connection units under a control of the control unit when the wireless earphones are connected, and to supply charging power to the wireless earphones.

14. A charging case comprising:
first and second connection units configured to electrically connect with wireless earphones;
first and second connection detection units allocated to the first and second connection units, respectively, and configured to separately detect whether the wireless earphones are connected;
a mode switch configured to direct a voice output mode to be switched in response to manual manipulation;
an amplification unit provided with first and second amplifiers, and configured to separately amplify sound signals, input to input terminals of the first and second amplifiers, by means of the first and second amplifiers;
first and second speakers configured to separately output the sound signals applied from the amplification unit;
a switching unit configured to switch an input path of the sound signals from the wireless earphones, connected to at least any one of the first and second connection units, to the input terminals of the first and second amplifiers of the amplification unit; and
a control unit configured to detect connection of the wireless earphones via at least any one of the first and second connection detection units, to apply a mode switching signal, directing a voice output mode to be switched, to the connected wireless earphones in response to manipulation of the mode switch so that the wireless earphones can output the sound signals to the connection units and the amplification unit can be driven, and to control the switching unit in accordance with the connected wireless earphones,
wherein at least one of the first and second connection units comprises:
connection terminals provided for communication with the wireless earphone, charging of the wireless earphone, and reception of sound signals from the wireless earphone; and
at least one permanent magnet configured to be magnetically connectable to a connection terminal made of a conductive magnetic material present in the wireless earphone; and
wherein at least one of the first and second connection detection units is a detection terminal provided for detection of a connection of the wireless earphone,
wherein the control unit turns off a function for communication with the wireless earphone when a connection of the wireless earphone is detected via at least any one of the first and second connection detection units, charging of the wireless earphone is completed via the power supply unit and then a predetermined condition is satisfied,
wherein the predetermined condition is a case where a predetermined period has elapsed after the completion of the charging of the wireless earphone without a separate speaker driving command.

15. The charging case of claim 14, further comprising:
a third connection unit configured to receive direct current (DC) power from an outside;
a power supply unit configured to store the DC power, applied via the third connection unit, therein and output the DC power, or to supply the DC power, applied via the third connection unit, directly to the wireless earphones as charging voltage and supply the DC power to the charging case as driving power; and
a charging switching unit configured to open a power supply path of the power supply unit for the wireless earphones connected to at least any one of the first and second connection units under a control of the control unit when the wireless earphones are connected, and to supply charging power to the wireless earphones.

* * * * *